Nov. 18, 1958  J. H. HOLSTEIN  2,860,796
MACHINERY USEFUL IN PROCESSING OF LIQUID PRODUCTS
Filed Nov. 10, 1955  3 Sheets-Sheet 1
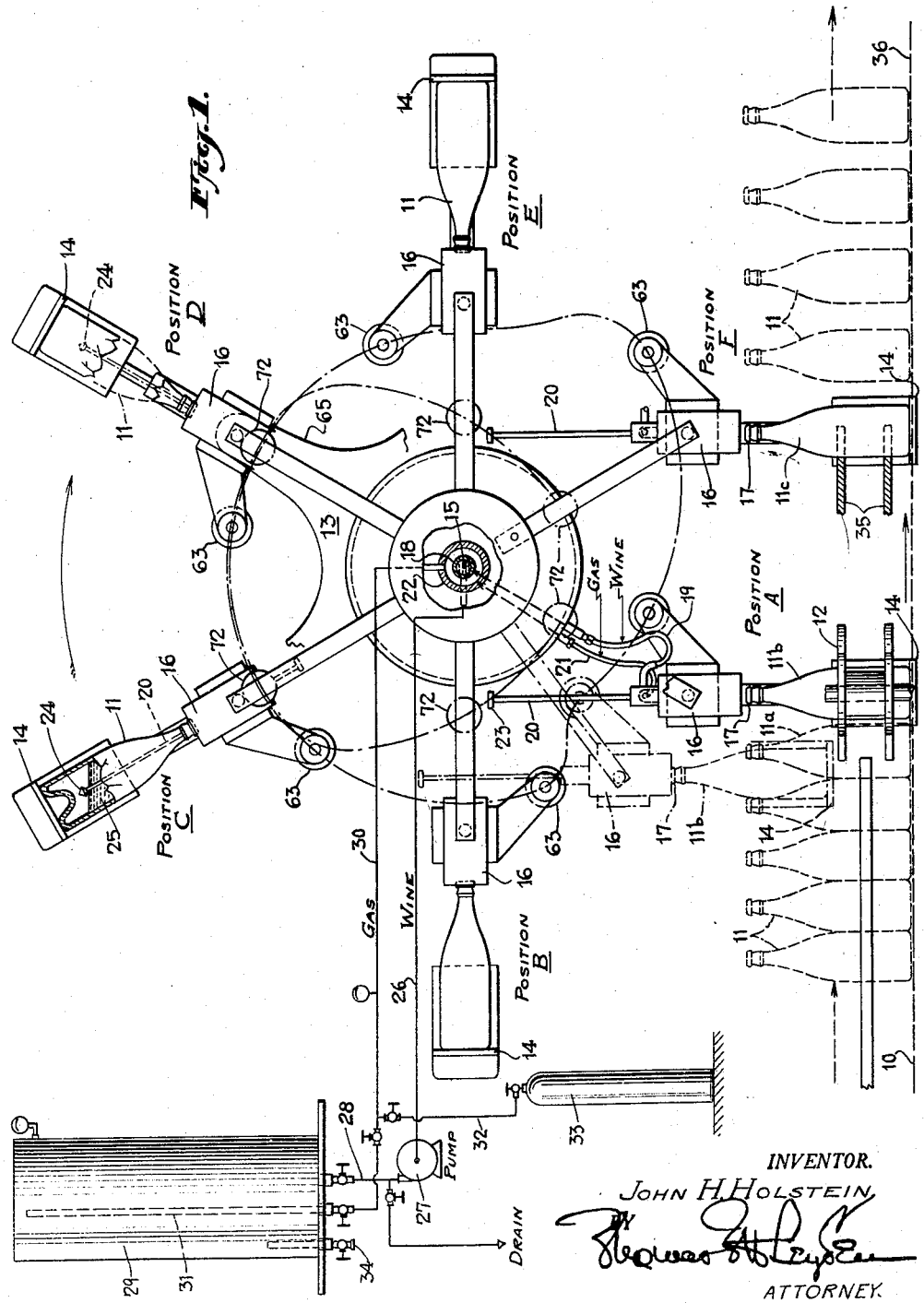
INVENTOR.
JOHN H. HOLSTEIN
ATTORNEY.

Nov. 18, 1958
J. H. HOLSTEIN
2,860,796
MACHINERY USEFUL IN PROCESSING OF LIQUID PRODUCTS
Filed Nov. 10, 1955
3 Sheets-Sheet 2
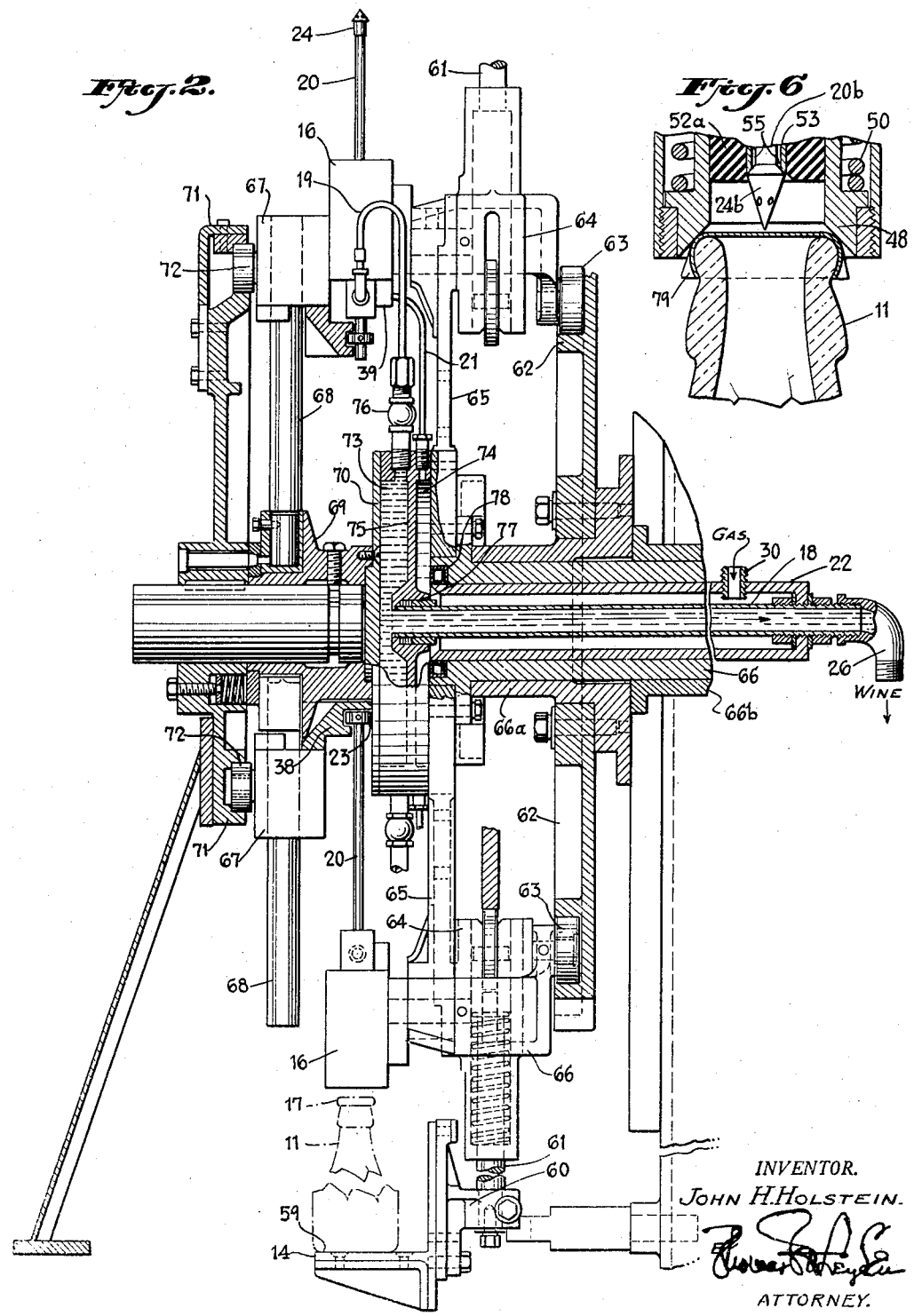
INVENTOR.
JOHN H. HOLSTEIN.
ATTORNEY.

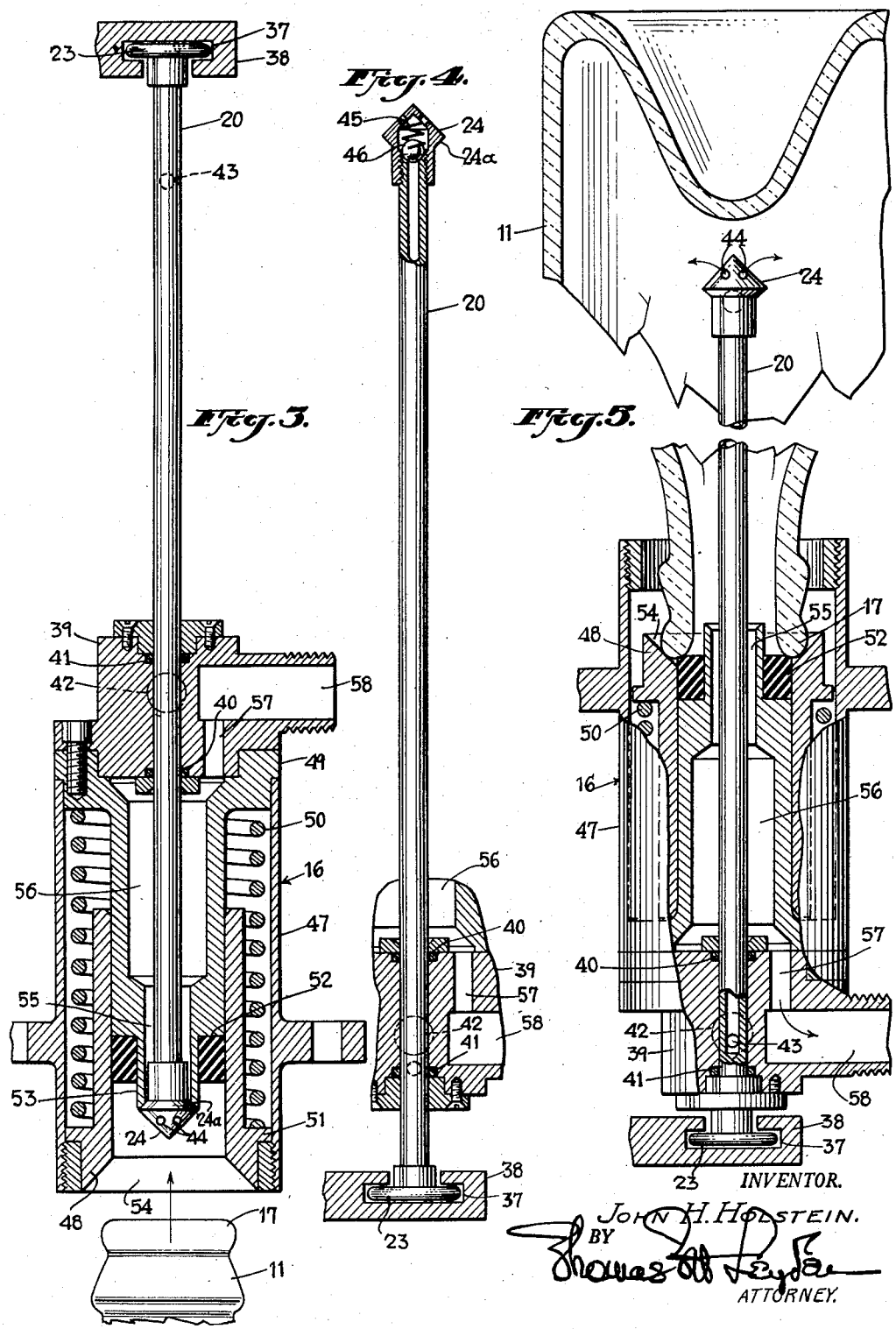

United States Patent Office 2,860,796
Patented Nov. 18, 1958

2,860,796

MACHINERY USEFUL IN PROCESSING OF LIQUID PRODUCTS

John H. Holstein, Fresno, Calif., assignor to Schenley Industries, Inc., New York, N. Y., a corporation of Delaware Application November 10, 1955, Serial No. 546,054

7 Claims. (Cl. 214—310)

This invention relates generally to machinery useful in processing of liquid products and, more particularly, it is concerned with apparatus for transferring liquids containing dissolved gas under super-atmospheric pressure from containers, such as bottles, to a decantation and blending tank in a continuous manner and without substantial loss of said liquids or gas.

In the manufacture of champagne, it is desirable to ferment the grape wine, yeast and sugar mixture in closed bottles. During fermentation, carbon dioxide forms and dissolves in the champagne, but at the same time, sediment consisting of yeast flock and possibly, small particles of skin from the grapes, pulp residue, small particles of twigs, etc., accumulate in the bottle and spoil the appearance of the wine. Before the champagne is ready for sale, this sediment must be removed.

In accordance with one process, the sediment is removed by riddling, chilling or freezing a portion of the champagne near the mouth of the inverted bottle, and degorging such portion along with the sediment. During the degorging step, the bottle cork is removed and, prior to recorking the bottle, a dosage, such as a brandy or sweet liqueur, is added to the champagne to adjust the flavor thereof and restore its original volume. This process requires considerable skill, it is time consuming and expensive, and it is not completely reliable in that the yeast flock does not always settle out properly, hence the decantation must be repeated.

It is possible to clarify the champagne and add the dosage thereto, using a process similar to the Charmat process, provided that the champagne can be transferred from the bottles to a Charmat tank under isobaric conditions. It is to be noted that the carbon dioxide is dissolved in the champagne under super-atmospheric pressure beyond its solubility limit at ordinary room temperatures and, therefore, will escape from the champagne unless it is confined under pressure or unless the champagne is chilled to a relatively low temperature which increases the solubility of the gas therein.

In accordance with this invention, the champagne is transferred from the bottles in which it was fermented to a decanting, blending and storage tank in a substantially continuous and automatic manner by apparatus which prevents substantial loss of the carbon dioxide from the champagne. While the champagne is in the tank, the dosage may be added, and the sediment may be removed by decantation or filtration. The bottles in which the clarified and treated champagne is to be sold may be filled from the tank.

The apparatus of the invention includes means for engaging a bottle filled with untreated but fermented champagne, means for supplying inert gas under super-atmospheric pressure to the interior of the bottle to expel the champagne, and means for conducting the expelled champagne under super-atmospheric pressure to a closed tank where it is processed. Preferably, the apparatus includes means for engaging several such bottles in rapid succession, so that the champagne is being discharged from at least one bottle at all times and shortly after one bottle is fully discharged a new bottle is engaged and the discharge of its contents is commenced. Preferably, also, automatic means are provided for delivering filled bottles in series to the afore-mentioned champagne transfer apparatus and for removing the empty bottles from the apparatus.

One of the objects of the invention is to provide apparatus which makes the process for treating champagne and similar liquids to remove sediment therefrom simple and inexpensive to perform.

A further object of the invention is to provide apparatus for the transfer of liquids containing dissolved gas under super-atmospheric pressure from individual, mobile containers to another and larger container without substantial loss of gas, which apparatus is substantially automatic in operation.

Other objects and advantages of the invention will be apparent hereinafter from the following detailed description of the presently preferred embodiments of this invention, which description is to be considered in connection with the accompanying drawings wherein:

Fig. 1 is a partly schematic, elevation view of a preferred embodiment of the invention;

Fig. 2 is an enlarged, side elevation view, partly in cross-section, of a portion of the apparatus shown in Fig. 1;

Figs. 3, 4 and 5 are enlarged elevation views, partly in cross-section, of a portion of the apparatus shown in the preceding figures; and Fig. 6 is an enlarged fragmentary cross-sectional view of a modified form of a portion of the apparatus shown in the preceding figures.

The preferred embodiment of the apparatus of this invention, illustrated in Fig. 1, comprises conveying means 10 for conveying champagne filled bottles 11, one after the other, to a loading position which in Fig. 1 is occupied by the bottle 11a. The conveying means 10 may be any conventional type of conveying means, such as a motor driven belt, and the bottles 11 move from the left to the right as viewed in Fig. 1. The bottles 11 and the champagne therein have previously been chilled to about 24 degrees Fahrenheit, and the bottle caps or corks have been removed, either by hand or by a machine. At 24 degrees Fahrenheit the carbon dioxide is readily held in solution even though the bottles are uncapped.

A star wheel 12, driven in synchronism with a rotatable means designated generally by the numeral 13, is mounted adjacent the loading position and pushes the bottle which is in the loading position on to a platform 14 carried by the rotatable means 13. The rotatable means 13 carries a plurality of the platforms 14 which are radially disposed with respect to the axis of rotation 15 of the rotatable means 13. Although the apparatus shown in Fig. 1 includes six platforms 14, it will be understood that a greater or lesser number of platforms may be employed.

The rotatable means 13 is continuously rotated by any conventional driving means (not shown) and is a modified form of a well-known type of bottle cleaning apparatus manufactured by the Pneumatic Scale Corporation, Ltd., Quincy, Massachusetts. Although the rotatable means 13 incorporates certain of the bottle handling mechanisms of the above mentioned said bottle cleaning apparatus, said apparatus, without modification is not suitable for use in the process of the present invention because this apparatus does not make fluid-tight connections with the bottles and it does not have provisions for conducting fluid under pressure from the bottles to an external storage tank. In view of the similarity between the rotatable means 13 and the equivalent mechanisms of the said bottle cleaning apparatus, the mechanisms forming part of the said apparatus will not be described herein in detail. Instead, general description thereof will be given and the new equipment required for modification of the said apparatus to accomplish the results of the present invention will be described in detail.

After a bottle has been moved from the loading position occupied by the bottle 11a to the platform 14 and, hence, to the position occupied by the bottle 11b, the platform 14 and the bottle 11b are moved by the rotatable support for the platform 14 from "position A" indicated in Fig. 1 to the position indicated in dotted lines in Fig. 1. In moving from "position A" to the position shown in dotted lines, the platform 14 moves toward a bottle mouth engaging means 16 causing the mouth 17 of the bottle 11b to be pressed tightly against and engage the means 16. Thus, when the platform 14 is tilted and is in "position B" wherein the longitudinal axis of the bottle extends radially of the axis 15, the bottle is prevented from falling off the platform 14.

Each of the bottle mouth engaging means 16 is connected to a fluid conducting tube 18 by means of a flexible hose 19. A gas tube 20, having a nozzle 24 at the end thereof, extends into the mouth engaging means 16, and when the tube 20 is moved to a position such that the nozzle 24 is fully inserted into a bottle mounted on a platform 14, the interior passageway of the tube 20 is connected by means of a flexible hose 21 to the interior of a gas conducting tube 22. The tube 20 is provided at one end thereof with a knob or button 23 which is insertable into and movable out of a slot in a cam driven slide (described hereinafter) so that it may assume the vertical position indicated in "position A" during the loading of the bottle 11b on the platform 14 and during the initial movement of the platform 14 away from "position A." However, when the platform 14 is rotated to "position B," the knob 23 enters into the slot in the cam driven slide and the slide pushes the tube into the bottle 11 as indicated at "position C," the tube 20 being inserted into the bottle 11 prior to reaching "position C."

When the tube 20 is fully inserted into the bottle 11 as indicated at "position C," an inert gas, such as nitrogen, under super-atmospheric pressure, is supplied to the interior of the bottle by the nozzle 24, the gas flowing to the nozzle 24 through the tube 20 from the tube 22. The gas expels the champagne 25 from the bottle and it flows through the tube 19 into the tube 18 and from the tube 18, by way of a tube or pipe 26, shown schematically, to a pump 27. The champagne is passed by the pump 27 through a tube or pipe 28 to a decanting, blending and storage tank 29.

The tube 22 is connected by way of a tube or pipe 30 to an isobaric tube 31 in the tank 29 and is also connected by the tube 30 and a tube or pipe 32 to a source 33 of an inert gas which, as mentioned above, may be nitrogen. The wine 25 is stored and treated as desired in the tank 29. When it is desired to remove it from the tank 29, it may be removed by means of the valved spout 34.

In practice, it has been found to be unnecessary continuously to supply gas from the source 33 throughout the champagne transfer process. Instead, the tank 29 may be charged with gas to a pressure of approximately 80 lbs. per square inch and then the source 33 may be disconnected from the tank 29. When the champagne enters the tank 29, it will be under pressure and therefore it will retain the carbon dioxide dissolved therein. As the champagne is fed to the tank 29 through the pipe 26, the nitrogen displaced by the champagne entering the tank 29 will flow through the pipe 30 and to the bottle or bottles 11 being emptied. The pump 27 assists in draining the champagne from the bottles 11 and forcing it into the tank 29. Of course, if gas alone is employed to force the champagne into the tank 29, the pump 27 may be omitted.

The rate at which the champagne is expelled from the bottle is such that when a platform 14 reaches "position E," the bottle 11 is empty or substantially empty. As the rotatable means 13 continues to rotate, the platform 14 tilts and finally assumes the position occupied by the platform 14 carrying the bottle 11c ("position F"), the bottle 11c being an empty bottle. By the time that the platform 14 reaches "position F," the tube 20 and its nozzle 24 have been withdrawn from the interior of the bottle and the platform 14 has moved away from the bottle mouth engaging means 16, permitting the mouth 17 of the bottle 11c to withdraw from the means 16. Accordingly, the bottle 11c is in the unloading position and may be removed from the platform 14 by means of a star wheel 35, which is driven in synchronism with the rotatable means 13. The star wheel 35 moves the bottle 11c onto a conveyor 36, which may be of the same type as the conveyor 10, and which extends from the unloading position to a bottle discharging position at the right of Fig. 1.

The bottle mouth engaging means 16 and the tube 20 with its associated nozzle 24 are shown in greater detail in Figs. 3–5. As illustrated in these Figures, the knob 23 at the end of the tube 20 is insertable into a slot 37 in the arm 38 of a slide described hereinafter. The tube 20 is slidable in a direction extending parallel to the longitudinal axis thereof and has a sliding fit with the upper portion 39 of the mouth engaging means 16. A gas tight connection with the portion 39 is provided by means of O-rings 40 and 41. The portion 39 is connected to the flexible hose 21 (Fig. 1) so that the expelling gas is supplied to the passageway 42 therein. The tube 20 has an aperture 43 therein and, when the tube 20 is in the position shown in Fig. 5, this aperture 43 is aligned with the passageway 42 so that gas is supplied to the interior of the tube 20 and hence to the nozzle 24. The nozzle 24 has a plurality of apertures 44 therein which communicate with the interior of the tube 20 and which permit the gas to enter into the bottle 11.

As shown in Fig. 4, the nozzle 24 has a check valve therein, comprising a spring 45 and a ball 46, so as to prevent fluid from entering the tube 20 when the tube 20 is in the position in which the aperture 43 is not in alignment with the passageway 42 and, hence, in which gas is not supplied to the interior of the tube 20.

The mouth receiving means 16 comprises an outer sleeve 47 which is co-axial with a slidable inner sleeve 48. The outer sleeve 47 is mounted on a further sleeve 49, which is secured to the portion 39, and the inner sleeve 48 is held in the lower position indicated in Fig. 3 by means of a spring 50, acting between the shoulder on the further sleeve 49 and a shoulder 51 on the sleeve 48. A resilient sealing ring 52 is mounted in the space between an extension 53 on the end of the sleeve 49 and the inner wall of the inner sleeve 48. When the bottle 11 is moved toward the engaging means 16 by the platform 14 on which the bottle 11 is positioned, the mouth 17 of the bottle first engages a bell-like guiding surface 54 of the sleeve 48, moving the sleeve 48 upwardly as viewed in Fig. 3. As the bottle 11 continues to press against the sleeve 48, it moves the sleeve 48 into the position shown in Fig. 5 and therefore the mouth 17 finally is pressed against and engages the sealing ring 52. The sealing ring 52 may be made of rubber, and when the mouth 17 is in engagement therewith, a fluid tight seal is formed between the ring 52 and the mouth 17. It will be noted from Fig. 5 that when the bottle mouth 17 is in engagement with the ring 52, the tube 20 is in its extended position and a fluid passageway 55 is provided between the tube 20 and the interior of the sleeve 49. When gas under pressure is supplied to the interior of the bottle 11 through the nozzle 24, the liquid in the bottle 11 flows through the passageway 55, through the chamber 56, through the passageway 57 and into the interior of the nipple 58, which is connected to the flexible hose 19 shown in Fig. 1. It will also be noted that when the tube 20 is in the retracted position shown in Fig. 3 the rearwardly tapered portion 24a of the nozzle 24 rests against a correspondingly tapered portion of the extension 53.

The rotatable means 13, the mechanisms for moving the tube 20 and the platform 14 and the liquid and gas conducting means are shown in greater detail in Fig. 2. The platform 14 has an upper surface 59 for receiving the base of a bottle 11. The platform 14 is mounted on a bracket 60, carried by a rod 61, which is vertically movable as viewed in Fig. 2. The movement of the rod 61 is controlled by a stationary cam 62 and a cam roller 63 riding on the face of the cam 62 which is shaped like the corresponding cam employed in the above-mentioned prior art bottle cleaning apparatus. The rod 61 slides in a guide 64 mounted on a plate 65 which is secured to a rotatable tubular shaft 66. The shaft 66 is driven by any suitable driving means (not shown) and is supported by a pair of bearings 66a and 66b.

The bottle mouth engaging means 16 is also mounted on the plate 65 and, therefore, is rotatable therewith. However, the engaging means 16, as well as the guide 64 and the bracket 66, are tiltably mounted with respect to an axis extending perpendicularly to the plate 65 so as to permit the platform 14 and the engaging means 16 to tilt, as heretofore described, as the plate 65 is rotated.

The arm 38, which engages the knob 23 on the tube 20, is carried by a slide 67, which is slidably mounted on a rod or shaft 68, carried by a collar 69, which is rotatable by the tubular shaft 66. The collar 69 is secured to the housing 70 which is secured to the plate 65. A stationary cam 71 which is shaped like the corresponding cam in the above-mentioned prior art bottle cleaning apparatus engages a roller 72, mounted on the slide 67, so that as the collar 69 is rotated, the slide 67 is moved radially by the cam 71.

It will be apparent from the above that as the plate 65 and the collar 69 are rotated by the shaft 66, the cam 62, in conjunction with the cam roller 63, will cause the platform 14 to move as heretofore described; and the cam 71, in conjunction with the roller 72, will cause the nozzle 24 to enter into the interior of the bottles 11 and to withdrawn therefrom as heretofore described.

The housing 70 is divided into two fluid-tight chambers 73 and 74 by means of a plate 75. The chamber 73 receives the liquid expelled from the bottles by way of the hose 19 which is connected to the housing 70 through a check valve 76, which prevents flow back into the bottle 11 when the tube 20 is retracted and prevents release of the liquid when the bottle mouth 17 is disengaged from the sealing ring 52. The liquid in the chamber 73 passes therefrom through the inside of the stationary tube 18, a fluid-tight seal between the rotatable plate 75 and the stationary tube 18 being provided by means of a gland 77.

The chamber 74 communicates with the interior of the tube 22 which, as heretofore described, is connected to a source of inert gas at super-atmospheric pressure by the tube or pipe 30. The flexible hose 21 extends from the chamber 74 to the portion 39 of the engaging means 16 heretofore described. The tube 22 is stationary, and a gas-tight seal is provided between the stationary tube 22 and the rotatable shaft 66 by sealing means 78 which is pressed into a groove in the shaft 66.

As mentioned above, if the caps or corks are removed from the filled bottles prior to loading of the bottles on the platforms 14, it is necessary that the bottles and their contents be chilled in order to prevent the loss of a substantial amount of dissolved gas from the liquid in the bottles prior to engagement of the mouth of an open bottle with the sealing ring 52 of the mouth engaging means 16. To avoid the necessity for chilling the bottles and their contents, the nozzle 24 and the tube 20 may be made relatively small in diameter, and the bottles may be mounted on the platform 14 with the caps still in place on the mouths thereof.

Fig. 6 illustrates the position of a bottle 11 after it has been partially raised by the platform 14 on which it is carried and at the moment that the cap 79 thereon engages the inner sleeve 48. As the bottle 11 is moved still further in the upward direction, as viewed in Fig. 6, the sleeve 48 moves upwardly against the pressure of the spring 50 and the nozzle 24b punctures the cap 79, it being noted that the nozzle 24b is held against the extension 53 during the puncturing of the cap 79. After the cap 79 has been punctured by the nozzle 24b and the cap 79 is in contact with the sealing ring 52a, the nozzle 24b is moved downwardly into the bottle 11 by its supporting tube 20b in the manner previously described and gas is admitted into the interior of the bottle 11, forcing the liquid therein to flow therefrom through the passageway 55 in the manner previously described.

As shown in Fig. 6, the maximum diameter of the nozzle 24b is greater than the outside diameter of the tube 20b so that the liquid in the bottle 11 may flow in the space between the wall of the puncture in the cap 79 and the outside of the tube 20b, and into the passageway 55. The extension 53 is shorter than the extension 53 shown in the preceding figures so as to prevent substantial displacement of the cap 79 by the end of the extension 53 when the bottle 11 is in its fully raised position and the cap 79 is in engagement with the sealing ring 52a. Also, the sealing ring 52a differs from the sealing ring 52 in the manner indicated in Fig. 6 so as to prevent sealing of the puncture in the cap 79 when the sealing ring 52a is in engagement with the cap 79.

Although the embodiment shown in Fig. 6 has the advantage over the embodiment previously described in that it is unnecessary to remove the caps from the mouths of the bottles and to chill the bottles and their contents, nevertheless the embodiment shown in Figs. 1–5 is preferred because the caps do not always puncture with a uniformly smooth surface and therefore difficulty is sometimes encountered in obtaining a fluid-tight seal between the sealing ring 52a and the cap 79. Also, during puncturing of the cap 79, a portion of the cap or its liner may flake causing clogging one of the gas or liquid passageways or valves, and in some cases, the deformation of the cap produced by the puncturing may make it difficult to remove the cap from the bottle at some subsequent time.

Having thus described this invention with particular reference to the preferred form thereof and having shown and described certain modifications, it will be obvious to those skilled in the art to which the invention pertains, after understanding the invention, that various changes and other modifications may be made therein without departing from the spirit and scope of the invention, as defined by the claims appended thereto.

What it is desired to secure by Letters Patent is:

1. Apparatus for transferring a liquid containing a dissolved gas under super-atmospheric pressure from a first container to a second container that comprises: rotatable first container carrying means having a plurality of container supporting means; container engaging means, carried by said rotatable means, for engaging a first container on said supporting means at predetermined positions of said rotatable means, said engaging means being adapted to have fluid-tight engagement with said first container; insertable means carried by said rotatable means and insertable into and removable from said first container when positioned on said supporting means; means for supplying gas under superatmospheric pressure to said insertable means; tubular fluid conducting means for interconnecting said container engaging means and said second container and for conducting said liquid from said first container to said second container; first cam means for engaging said container engaging means in fluid-tight engagement with said first container in a first predetermined position of said rotatable means and for disengaging said container engaging means from said first container in a second predetermined position of said rotatable means; and second cam means for inserting said insertable means into said first container when said container engaging means is in engagement with said first container and for withdrawing said insertable means from said first container.

2. Apparatus for transferring wine containing a dissolved gas under super-atmospheric pressure from bottles to a decanting tank that comprises: rotatable bottle carrying means having a plurality of bottle supporting means, disposed radially of the axis of said rotatable means and movable radially with respect to said axis; bottle mouth engaging means, carried by said rotatable means, for engaging the mouths of bottles on said supporting means at predetermined positions of said rotatable means, said engaging means being adapted to have fluid-tight engagement with a bottle mouth; a plurality of nozzles carried by said rotatable means and insertable into and removable from said bottles when positioned on said supporting means; a decanting tank; means for supplying gas under pressure to said tank; tubular gas conducting means connected to said nozzles for supplying gas under pressure to said nozzles; tubular fluid conducting means interconnecting said mouth engaging means and said tank for conducting wine from said bottles to said tank; first cam means for moving said supporting means and for thereby moving the mouth of a bottle in to fluid-tight engagement with one of said mouth engaging means in a first predetermined position of said rotatable means and for moving the mouth of a bottle away from said mouth engaging means in a second predetermined position of said rotatable means; second cam means for inserting said nozzles into the bottles having their mouths in engagement with said mouth engaging means and for withdrawing said nozzles from said bottles; and means operable in timed relationship with said second cam means for supplying gas under super-atmospheric pressure to said gas conducting means and to said nozzles and into said bottles after said nozzles have been inserted into said bottles.

3. Apparatus for transferring wine containing a dissolved gas under super-atmospheric pressure from bottles to a decanting tank that comprises: rotatable bottle inverting means comprising a plurality of platforms for receiving and supporting said bottles; bottle mouth engaging means carried by said rotatable means for engaging the mouths of said bottles on said platforms at predetermined positions of said rotatable means, said engaging means being adapted to have fluid-tight engagement with a bottle mouth; a plurality of nozzles carried by said rotatable means and insertable into and removable from said bottles when positioned on said platforms; a decanting tank; tubular gas conducting means connected to said nozzles for supplying gas to said nozzles; tubular fluid conducting means interconnecting said mouth engaging means and said tank for conducting wine from said bottles to said tank; first cam means for producing relative movement between said platforms and said engaging means and for thereby engaging the mouth of a bottle in fluid-tight engagement with one of said mouth engaging means and for subsequently disengaging the mouth of a bottle from said mouth engaging means as said rotatable means is rotated; second cam means for inserting said nozzles into the bottles having their mouths in engagement with said mouth engaging means and for withdrawing said nozzles from said bottles; and means for supplying gas under super-atmospheric pressure to said gas conducting means and said nozzles when said nozzles are inserted in said bottles for thereby supplying gas to the interior of said bottles and expelling the wine therefrom.

4. Apparatus for transferring wine containing a dissolved gas under super-atmospheric pressure from bottles to a decanting tank that comprises: rotatable bottle inverting means comprising a plurality of platforms for receiving and supporting said bottles, said platforms being disposed radially of the axis of said rotatable means and being movable radially with respect to said axis; bottle mouth engaging means carried by said rotatable means for engaging the mouths of said bottles on said platforms at predetermined positions of said rotatable means, said engaging means being adapted to have fluid-tight engagement with a bottle mouth; a plurality of nozzles carried by said rotatable means and insertable into and removable from said bottles when positioned on said platforms; a decanting tank; tubular gas conducting means connected to said nozzles for supplying gas to said nozzles; tubular fluid conducting means interconnecting said mouth engaging means and said tank for conducting wine from said bottles to said tank; first cam means for moving said platforms radially and for thereby moving the mouth of a bottle into fluid-tight engagement with one of said mouth engaging means and for subsequently moving the mouth of a bottle away from said mouth engaging means as said rotatable means is rotated; second cam means for inserting said nozzles into the bottles having their mouths in engagement with said mouth engaging means and for withdrawing said nozzles from said bottles; and means for supplying gas under super-atmospheric pressure to said gas conducting means and said nozzles when said nozzles are inserted in said bottles for thereby supplying gas to the interior of said bottles and expelling the wine therefrom.

5. Apparatus for transferring wine containing a dissolved gas under super-atmospheric pressure from bottles to a decanting tank that comprises: rotatable bottle carrying means having a plurality of bottle supporting platforms disposed radially of the axis of said rotatable means and movable radially with respect to said axis; bottle mouth engaging means carried by said rotatable means for engaging the mouths of bottles on said platforms at predetermined positions of said rotatable means, said engaging means being adapted to have fluid-tight engagement with a bottle mouth; a plurality of nozzles carried by said rotatable means and insertable into and removable from said bottles when positioned on said platforms; a decanting tank; means for supplying gas under pressure to said tank; tubular gas conducting means interconnecting one portion of said tank with said nozzles for supplying gas under super-atmospheric pressure to said nozzles; pump means; tubular fluid conducting means interconnecting said mouth engaging means and said pump means and interconnecting said pump means and another portion of said tank for conducting wine from said bottles to said tank; first cam means for moving said platforms radially and for moving the mouth of a bottle into fluid-tight engagement with one of said mouth engaging means in a first predetermined position of said rotatable means and for moving the mouth of a bottle away from said mouth engaging means in a second predetermined position of said rotatable means; second cam means for inserting said nozzles into the bottles having their mouths in engagement with said mouth engaging means and for withdrawing said nozzles from said bottles; and means operable in timed relationship with said second cam means for permitting the passage of gas from said gas conducting means to said nozzles and into said bottles after said nozzles have been inserted into said bottles.

6. Apparatus for transferring wine containing a dissolved gas under super-atmospheric pressure at room temperature from bottles to a decanting tank that comprises: first conveying means for conveying wine filled bottles to a loading position; rotatable bottle inverting means mounted adjacent said loading position and comprising a plurality of platforms disposed radially of the axis of said rotatable means and movable radially with respect to said axis; loading means mounted adjacent said loading position for successively loading said bottles on said platforms; bottle mouth engaging means carried by said rotatable means for engaging the mouths of said bottles when positioned on said platforms at predetermined positions of said rotatable means, said engaging means being adapted to have fluid-tight engagement with a bottle mouth; a plurality of nozzles carried by said rotatable means and insertable into and removable from said bottles on said platforms; second conveying means for conveying unfilled said bottles away from said rotatable means, said conveying means extending from an unloading position adjacent but spaced from said loading position to a discharging position and said rotatable means being adapted to transfer said bottles from said loading position to said unloading position; unloading means mounted adjacent said unloading position for successively transferring said bottles from said platforms to said second conveying means; a decanting tank; means for supplying tubular gas under super-atmospheric pressure to said tank; gas conducting means extending from said tank to said nozzles for supplying gas under super-atmospheric pressure to said nozzles; tubular fluid conducting means interconnecting said mouth engaging means and said tank for conducting wine from said bottles to said tank; first cam means for moving said platforms radially and for thereby moving the mouth of a bottle on a platform into fluid-tight engagement with one of said mouth engaging means as the platform carrying said last-mentioned bottle is moved away from said loading position by rotation of said rotatable means and for moving the mouth of a bottle away from said mouth engaging means as the platform carrying said last-mentioned bottle approaches said unloading position; second cam means for inserting said nozzles into the bottles having their mouths in engagement with said mouth engaging means and for withdrawing said nozzles from said bottles; and means for interconnecting said gas conducting means and said nozzles when said nozzles are inserted in said bottles for thereby supplying gas to the interior of said bottles and expelling the wine therefrom.

7. Apparatus for transferring wine containing a dissolved gas under super-atmospheric pressure at room temperature from bottles to a decanting tank that comprises: first conveying means for conveying wine filled bottles to a loading position; rotatable bottle inverting means mounted adjacent said loading position and comprising a plurality of platforms disposed radially of the axis of said rotatable means and movable radially with respect to said axis; loading means mounted adjacent said loading position for successively loading said bottles on said platforms; bottle mouth engaging means carried by said rotatable means for engaging the mouths of said bottles when positioned on said platforms at predetermined positions of said rotatable means, said engaging means being adapted to have fluid-tight engagement with a bottle mouth; a plurality of nozzles carried by said rotatable means and insertable into and removable from said bottles on said platforms, said nozzles having valves therein for permitting one-way flow of gas therefrom and said nozzles being in fluid-tight connection with said engaging means; second conveying means for conveying unfilled said bottles away from said rotatable means, said conveying means extending from an unloading position adjacent but spaced from said loading position to a discharging position and said rotatable means being adapted to transfer said bottles from said loading position to said unloading position; unloading means mounted adjacent said unloading position for successively transferring said bottles from said platforms to said second conveying means; a decanting tank; means for supplying an inert gas under a pressure greater than the pressure of the gas in said wine to said tank; tubular gas conducting means extending from one portion of said tank to said nozzles for supplying gas under pressure to said nozzles; pump means; tubular fluid conducting means interconnecting said mouth engaging means and said pump means and interconnecting said pump means and another portion of said tank for conducting wine from said bottles to said tank; first cam means for moving said platforms radially and for thereby moving the mouth of a bottle on a platform into fluid-tight engagement with one of said mouth engaging means as the platform carrying said last-mentioned bottle is moved away from said loading position by rotation of said rotatable means and for moving the mouth of a bottle away from said mouth engaging means as the platform carrying said last-mentioned bottle approaches said unloading position; second cam means for inserting said nozzles into the bottles having their mouths in engagement with said mouth engaging means and for withdrawing said nozzles from said bottles; and means operable by said second cam means for interconnecting said gas conducting means and said nozzles when said nozzles are inserted in said bottles for thereby supplying gas to the interior of said bottles and expelling the wine therefrom.

References Cited in the file of this patent

UNITED STATES PATENTS

| 2,145,765 | Huntley et al. | Jan. 31, 1939 |
| 2,548,589 | Chelle | Apr. 10, 1951 |
| 2,676,742 | Day et al. | Apr. 27, 1954 |